(12) United States Patent
Huang

(10) Patent No.: US 10,425,929 B2
(45) Date of Patent: Sep. 24, 2019

(54) VOICE OVER INTERNET PROTOCOL SERVICES

(75) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 190 days.

(21) Appl. No.: 14/007,324

(22) PCT Filed: Jul. 13, 2011

(86) PCT No.: PCT/CN2011/077110
§ 371 (c)(1),
(2), (4) Date: Sep. 24, 2013

(87) PCT Pub. No.: WO2013/007022
PCT Pub. Date: Jan. 17, 2013

(65) Prior Publication Data
US 2014/0016592 A1    Jan. 16, 2014

(51) Int. Cl.
*H04W 72/04* (2009.01)
*H04W 72/12* (2009.01)

(52) U.S. Cl.
CPC ..... *H04W 72/042* (2013.01); *H04W 72/1278* (2013.01); *H04W 72/04* (2013.01)

(58) Field of Classification Search
CPC ..... H04W 72/04; H04W 8/24; H04W 72/042; H04L 1/1664; H04L 1/1854; H04L 1/1887; H04L 12/66
See application file for complete search history.

(56) References Cited

U.S. PATENT DOCUMENTS

| 2008/0084851 | A1* | 4/2008 | Kim ............... H04W 72/048 370/336 |
| 2008/0117891 | A1 | 5/2008 | Damnjanovic et al. |
| 2008/0232333 | A1* | 9/2008 | Jeong ............ H04W 72/1289 370/336 |
| 2009/0232118 | A1 | 9/2009 | Wang et al. |
| 2009/0238120 | A1* | 9/2009 | Cai ................ H04W 72/1284 370/329 |
| 2009/0268693 | A1* | 10/2009 | Lindh et al. ............ 370/336 |
| 2009/0274107 | A1* | 11/2009 | Park .................. H04L 12/66 370/329 |
| 2010/0091728 | A1* | 4/2010 | Kim et al. ............... 370/329 |
| 2010/0118798 | A1* | 5/2010 | Chun et al. ............. 370/329 |

(Continued)

FOREIGN PATENT DOCUMENTS

| CN | 101330700 A | 12/2008 |
| CN | 101355818 A | 1/2009 |
| CN | 101938840 A | 1/2011 |
| CN | 101971554 A | 2/2011 |
| JP | 2011517883 A | 6/2011 |
| KR | 1020090017445 A | 2/2009 |

(Continued)

OTHER PUBLICATIONS

3GPP TS 36.321 "3rd Generation Partnership Project; Technical Specification Group radio Access Network; Evolved Universal Terrestrial Radio Access (E-UTRA); Medium Access Control (MAC) protocol specification" pp. 1-23, 3GPP Organizational Partners (ARIB, ATIS, CCSA, ETSI, TTA, TTC) (2007).

(Continued)

*Primary Examiner* — Noel R Beharry
*Assistant Examiner* — Wilfred Thomas

(57) ABSTRACT

Technologies and implementations for resource allocation for Voice over Internet Protocol are generally disclosed.

16 Claims, 5 Drawing Sheets

(56) References Cited

U.S. PATENT DOCUMENTS

| | | | | |
|---|---|---|---|---|
| 2010/0238875 | A1* | 9/2010 | Sung | H04L 12/66 370/329 |
| 2011/0194538 | A1* | 8/2011 | Zheng | H04W 76/048 370/335 |
| 2011/0292901 | A1* | 12/2011 | Pettersson | H04W 72/1252 370/329 |
| 2012/0093121 | A1 | 4/2012 | Zhang | |

FOREIGN PATENT DOCUMENTS

| | | |
|---|---|---|
| KR | 1020090060304 A | 6/2009 |
| KR | 1020100126509 A | 12/2010 |
| WO | 2008023649 A1 | 2/2008 |
| WO | 2010028106 A2 | 3/2010 |
| WO | 2010033857 A1 | 3/2010 |
| WO | 2010090565 A1 | 8/2010 |
| WO | 2011000231 A1 | 1/2011 |

OTHER PUBLICATIONS

3GPP TS 36.323 "3rd Generation Partnership Project; Technical Specification Group radio Access Network; Evolved Universal Terrestrial Radio Access (E-UTRA); Packet Data Convergence Protocol (PDCP) Specification" pp. 1-25, 3GPP Organizational Partners (ARIB, ATIS, CCSA, ETSI, TTA, TTC) (2008).

3GPP TS 36.331 "3rd Generation Partnership Project; Technical Specification Group radio Access Network; Evolved Universal Terrestrial Radio Access (E-UTRA); Radio Resource Control (RRC); Protocol Specification" pp. 1-151, 3GPP Organizational Partners (ARIB, ATIS, CCSA, ETSI, TTA, TTC) (2008).

International Search Report with Written Opinion for International Application No. PCT/CN2011/077110, Chinese Patent Office, dated Apr. 12, 2012.

Supplementary European search report for counterpart Patent No. 11869237.5 dated Mar. 2, 2015.

* cited by examiner

400 A computer program product

402 A signal bearing medium

404 Machine-readable instructions that, when executed, cause a computing device to:

transmit a scheduling request to a base station in response to a silence descriptor packet being detected at a terminal buffer of the terminal during an idle state of the Voice over Internet Protocol service;

transmit a scheduling request to a base station in response to a silence descriptor packet being detected at a terminal buffer of the terminal during an idle state of the Voice over Internet Protocol service;

receive a scheduling signal from the base station, wherein the scheduling signal includes a resource allocation sufficient to transmit the silence descriptor packet;

transmit the silence descriptor packet to the base station in response to the received scheduling signal;

transmit a scheduling request to a base station in response to a voice data packet being detected at a terminal buffer of the terminal during a transition between an idle state of the Voice over Internet Protocol service to an active state of the Voice over Internet Protocol service;

receive a scheduling signal from the base station wherein the scheduling signal includes a resource allocation;

transmit a packet including a buffer state report and at least a portion of the voice data packet to the base station in response to the received scheduling signal;

receive a first scheduling request from a terminal during an idle state of the Voice over Internet Protocol service;

transmit a first scheduling signal to the terminal, wherein the first scheduling signal includes a first resource allocation;

receive a silence descriptor packet from the terminal according to a dynamic scheduling protocol;

receive a second scheduling request from the terminal during a transition between the idle state of the Voice over Internet Protocol service to an active state of the Voice over Internet Protocol service;

transmit a second scheduling signal to the terminal wherein the second scheduling signal includes a second resource allocation;

receive a packet including a buffer state report and at least a portion of a voice data packet from the terminal; or transmit a semi-persistent scheduling signal to the terminal.

| 406 a computer-readable medium | 408 a recordable medium | 410 a communications medium |

Fig. 4

VOICE OVER INTERNET PROTOCOL SERVICES

CROSS-REFERENCE TO RELATED APPLICATION

This Application is the U.S. National Stage filing under 35 U.S.C. § 371 of International Application Ser. No. PCT/CN11/77110 filed on Jul. 13, 2011. The disclosure of the International Application is hereby incorporated herein by reference in its entirety.

BACKGROUND

Unless otherwise indicated herein, the approaches described in this section are not prior art to the claims in this application and are not admitted to be prior art by inclusion in this section.

In some mobile communications systems, voice services may be implemented as Voice over Internet Protocol (VoIP) such that the service may be implemented as data packets that may be assembled at a mobile device and transmitted via an uplink channel to a base station. In such systems, it may be advantageous to provide for efficient usage of uplink and downlink channels.

SUMMARY

The present disclosure describes example methods for providing a Voice over Internet Protocol service at a terminal. Example methods for a terminal device may include transmitting a scheduling request to a base station in response to a silence descriptor packet being detected at a terminal buffer of the terminal during an idle state of the Voice over Internet Protocol service, receiving a scheduling signal including resource allocation sufficient to transmit the silence descriptor packet from the base station, and transmitting the silence descriptor packet to the base station in response to the received scheduling signal. Example methods for a terminal device may also include transmitting a scheduling request to a base station in response to a voice data packet being detected at a terminal buffer of the terminal during a transition between an idle state of the Voice over Internet Protocol service to an active state of the Voice over Internet Protocol service, receiving a scheduling signal that includes a resource allocation from the base station, and transmitting a packet including a buffer state report and at least a portion of the voice data packet to the base station in response to the received scheduling signal.

The present disclosure also describes example methods for providing a Voice over Internet Protocol service at a base station. Example methods for a base station may include receiving a first scheduling request from a terminal during an idle state of the Voice over Internet Protocol service, transmitting a first scheduling signal including a first resource allocation to the terminal, receiving a silence descriptor packet from the terminal according to a dynamic scheduling protocol, receiving a second scheduling request from the terminal during a transition between the idle state of the Voice over Internet Protocol service to an active state of the Voice over Internet Protocol service, transmitting a second scheduling signal including a second resource allocation to the terminal, receiving a packet including a buffer state report and at least a portion of a voice data packet from the terminal, and transmitting a semi-persistent scheduling signal to the terminal.

The present disclosure also describes example machine readable non-transitory media having stored therein instructions that, when executed, cause a terminal to provide a Voice over Internet Protocol service by transmitting a scheduling request to a base station in response to a silence descriptor packet being detected at a terminal buffer of the terminal during an idle state of the Voice over Internet Protocol service, receiving a scheduling signal including resource allocation sufficient to transmit the silence descriptor packet from the base station, and transmitting the silence descriptor packet to the base station in response to the received scheduling signal.

The present disclosure also describes example machine readable non-transitory media having stored therein instructions that, when executed, cause a terminal to provide a Voice over Internet Protocol service by transmitting a scheduling request to a base station in response to a voice data packet being detected at a terminal buffer of the terminal during a transition between an idle state of the Voice over Internet Protocol service to an active state of the Voice over Internet Protocol service, receiving a scheduling signal that includes a resource allocation from the base station, and transmitting a packet including a buffer state report and at least a portion of the voice data packet to the base station in response to the received scheduling signal.

The present disclosure also describes example machine readable non-transitory media having stored therein instructions that, when executed, cause a base station to provide a Voice over Internet Protocol service by receiving a first scheduling request from a terminal during an idle state of the Voice over Internet Protocol service, transmitting a first scheduling signal including a first resource allocation to the terminal, receiving a silence descriptor packet from the terminal according to a dynamic scheduling protocol, receiving a second scheduling request from the terminal during a transition between the idle state of the Voice over Internet Protocol service to an active state of the Voice over Internet Protocol service, transmitting a second scheduling signal including a second resource allocation to the terminal, receiving a packet including a buffer state report and at least a portion of a voice data packet from the terminal, and transmitting a semi-persistent scheduling signal to the terminal.

The present disclosure also describes example devices. Some example devices may include a processor and a machine readable medium having stored therein instructions that, when executed by the processor, cause the device to provide a Voice over Internet Protocol service by transmitting a scheduling request to a base station in response to a silence descriptor packet being detected at a terminal buffer of the terminal during an idle state of the Voice over Internet Protocol service, receiving a scheduling signal including resource allocation sufficient to transmit the silence descriptor packet from the base station, and transmitting the silence descriptor packet to the base station in response to the received scheduling signal.

Some example devices may include a processor and a machine readable medium having stored therein instructions that, when executed by the processor, cause the device to provide a Voice over Internet Protocol service by transmitting a scheduling request to a base station in response to a voice data packet being detected at a terminal buffer of the terminal during a transition between an idle state of the Voice over Internet Protocol service to an active state of the Voice over Internet Protocol service, receiving a scheduling signal that includes a resource allocation from the base station, and transmitting a packet including a buffer state report and at least a portion of the voice data packet to the base station in response to the received scheduling signal.

Some example devices may include a processor and a machine readable medium having stored therein instructions that, when executed by the processor, cause the device to provide a Voice over Internet Protocol service by receiving a first scheduling request from a terminal during an idle state of the Voice over Internet Protocol service, transmitting a first scheduling signal including a first resource allocation to the terminal, receiving a silence descriptor packet from the terminal according to a dynamic scheduling protocol, receiving a second scheduling request from the terminal during a transition between the idle state of the Voice over Internet Protocol service to an active state of the Voice over Internet Protocol service, transmitting a second scheduling signal including a second resource allocation to the terminal, receiving a packet including a buffer state report and at least a portion of a voice data packet from the terminal, and transmitting a semi-persistent scheduling signal to the terminal.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is an illustration of an example computer program product; and

DETAILED DESCRIPTION

Figure 1:
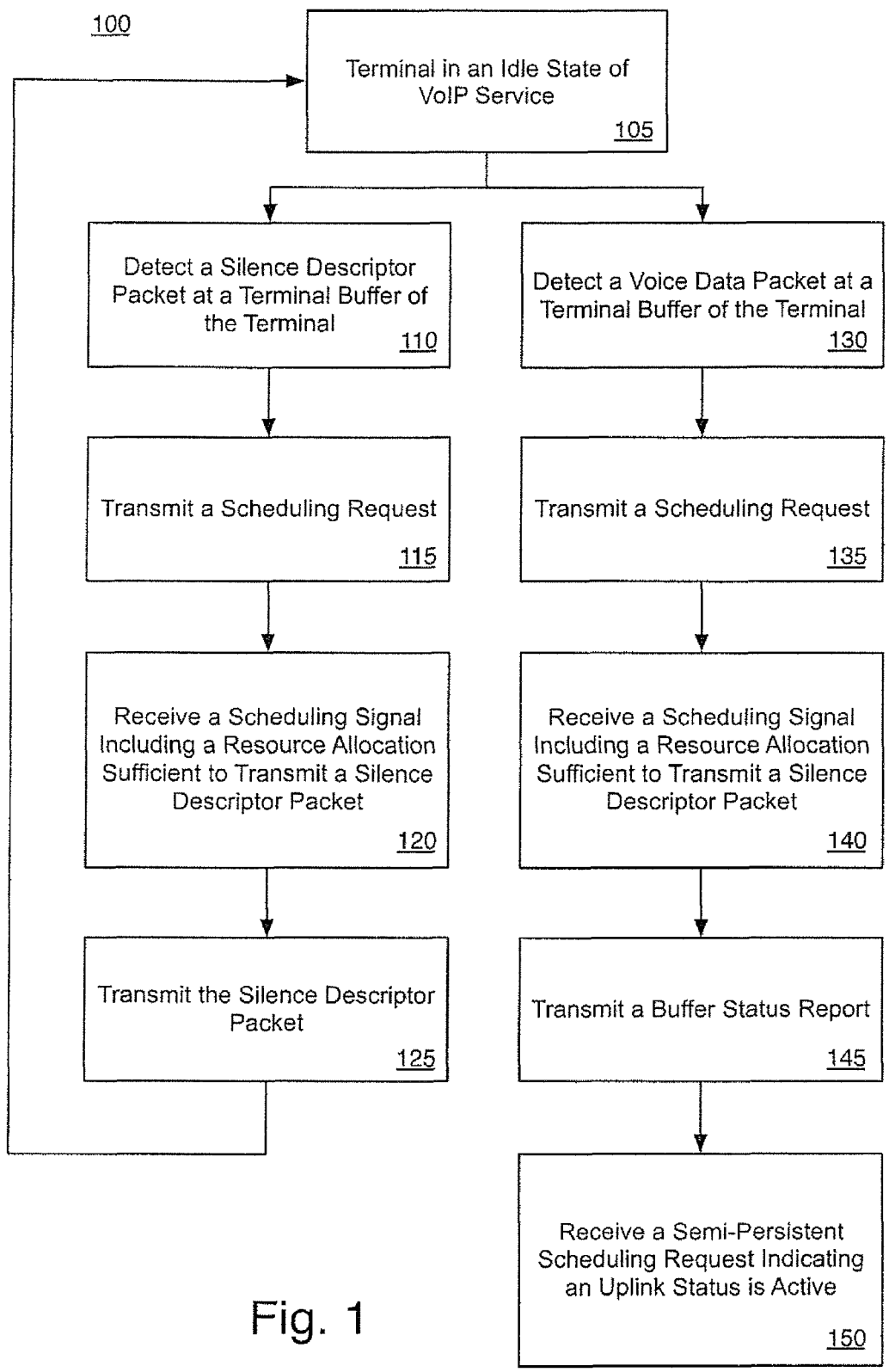
FIG. 1 is an illustration of a flow chart of an example method for providing VoIP services at a terminal.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing Voice over Internet Protocol services.

In some mobile communications systems, such as, for example, Long Term Evolution (LTE) systems, voice services may be implemented as Voice over Internet Protocol (VoIP) services. A VoIP service implementation may include assembling data packets at a terminal device and transmitting the assembled data packets to a base station over an uplink channel (for eventual routing and transmission to a receiving terminal device). During operation, such as, for example, during a call, VoIP services may be in one of two states: idle and active. In general, the VoIP services may be in the idle state for about half the duration of the service and in the active state for about half the duration of the service. In the active (or ON) state, data packets including voice service may be ready to be transmitted (i.e., the user may be talking and packets including voice service may be assembled for transmission) over the uplink channel. In the idle (or OFF) state, there may not be data packets including voice service to be transmitted (i.e., the user may be silent during that portion of the call). Although there may not be active voice service to be transmitted, it may be beneficial to send low background noise during the idle or silent periods. Such background noise may provide the party on the other end of the call an indication that the call has not been disconnected and a level of comfort during the call (i.e., receiving full silence can be disconcerting for a speaker). Thereby, the low background noise may provide comfort and ease of use in the VoIP service. In some examples, the background noise may be assembled as silence descriptor packets at the terminal during the idle state. Similar to voice data packets, the silence descriptor packets may be transmitted to the base station over the uplink channel.

In general, the voice data packets may be larger and sent more frequently during the active state than the silence descriptor packets sent during the idle state. In some examples, during the active state, voice data packets of about 40 bytes may be transmitted about every 20 milliseconds (at the beginning of an active state, the voice packets may be larger, generally about 97 bytes, due to a lag time in the start of packet compression, such as packet data convergence protocol compression) and, during the idle state, silence descriptor packets of about 15 bytes may be transmitted about every 160 milliseconds. During the VoIP service, the terminal device may also transmit buffer status reports to the base station to indicate the magnitude and/or type of packets that may be uplinked. In some examples, a buffer status report packet may be about 7 bytes. Also, in general, during a call, transitions between the active and idle states may be relatively rare. In some examples, the probability of a transition (from idle to active or active to idle) during a call may be on the order of about 1%. Therefore, the probability of no transition between the states may be relatively high, on the order of about 99% in some examples.

In typical mobile communication services (including typical VoIP implementations), resource allocation may be performed by a scheduler or schedulers at a base station. A typical exchange may be as follows. A terminal having a packet or packets to be uplinked to the base station may transmit a scheduling request to the base station. The base station may receive the scheduling request and may transmit a scheduling signal including a request for a buffer status report to the terminal. The terminal may receive the scheduling signal and may transmit the terminal's buffer status report to the base station in response to the scheduling signal. The buffer status report may include a report on the type and quantity of packets at the memory buffer of the terminal. The base station may receive the buffer status report, allocate uplink channel resources to the terminal, and transmit a scheduling signal to the terminal indicating the uplink channel resources allocated to the terminal. The terminal may transmit the packet or packets over the allocated uplink channel resources to the base station for eventual routing to a receiving terminal device.

In examples discussed herein, an efficient usage and allocation of uplink and downlink channels may be provided. In some implementations, during an idle state of the VoIP service, a terminal may detect a silence descriptor packet being at the terminal buffer of the terminal. The terminal may transmit a scheduling request to a base station in response to the silence descriptor packet being detected at the terminal buffer. The base station may receive the scheduling request from the terminal and may transmit a scheduling signal including a resource allocation sufficient to transmit the silence descriptor packet. The terminal may receive the scheduling signal and may transmit the silence descriptor packet to the base station in response to the received scheduling signal.

In some examples, during a transition between an idle state of the VoIP service and an active state of the VoIP service, a voice data packet may be detected at the terminal buffer. A scheduling request may be transmitted to the base station in response to the voice data packet being detected at the terminal buffer. The base station may receive the scheduling request from the terminal and may transmit a scheduling signal including a resource allocation sufficient to transmit a silence descriptor packet but insufficient to transmit the voice data packet. In some examples, the terminal may receive the scheduling signal and may transmit a buffer status report in response to the received scheduling signal. In some examples, the terminal may receive the scheduling signal and may transmit a buffer status report and a portion of a voice data packet in response to the received scheduling signal. Subsequently, during an active portion of the call, the terminal and the base station may enter into semi-persistent scheduling such that an uplink status from the terminal to the base station is active. As will be appreciated, the described examples may eliminate traffic on the uplink and downlink channels and may also eliminate a time lag in the transmission of the silence descriptor packet. In some examples, during the idle state of the VoIP service, the transmission of buffer status reports may be reduced by up to about 99%.

FIG. 1 is an illustration of a flow chart of an example method 100 for providing VoIP services at a terminal, arranged in accordance with at least some embodiments of the present disclosure. Method 100 may be performed by any suitable device discussed herein. Method 100, and other methods and techniques described herein set forth various functional blocks or actions that may be described as processing steps, functional operations, events and/or acts, etc., which may be performed by hardware, software, and/or firmware. Numerous alternatives to the functional blocks shown in FIG. 1 may be practiced in various implementations. For example, although method 100, as shown in FIG. 1, may comprise one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Method 100 may include one or more of functional operations as indicated by one or more of blocks 105, 110, 115, 120, 125, 130, 135, 140, 145 and/or 150. The process of method 100 may begin at block 105.

At block 105, "Terminal in an Idle State of VoIP Protocol Service", a terminal may be in an idle state of a VoIP service such as, for example, a portion of a call where the user of the terminal may be silent or substantially silent. In general, the terminal may include any suitable device for communicating over a VoIP service. In various examples, the terminal may include a mobile phone, a smartphone, a laptop computer, a netbook device, a tablet device, a personal digital assistant, or the like. The terminal may be configured to communicate over any suitable communication system. In some examples, the terminal may be configured to communicate over a long-term evolution (LTE) communications system. In some examples, the terminal may be configured to communicate over a fourth generation long-term evolution (LTE) communications system.

As discussed, during a VoIP service, a terminal may be in an idle state or an active state. At block 105, the terminal may be in an idle state. In general, the terminal may alternate between an active and an idle state during a VoIP service. In some examples, during the idle state, the terminal and the base station may communicate using dynamic scheduling. As shown in FIG. 1, when in the idle state, a packet may be detected at the terminal buffer of the terminal. The terminal buffer may include any suitable memory buffer and/or memory control logic to implement a terminal buffer for the storage of detection of VoIP service packets. In some instances, the detected packet may be a silence descriptor packet as shown at block 110, "Detect a Silence Descriptor Packet at a Terminal Buffer of the Terminal". In some examples, a silence descriptor packet may be considered an inserted packet and may be referred to as a silence insertion descriptor packet. In other instances, the detected packet may be a voice data packet as shown at block 130, "Detect a Voice Data Packet at a Terminal Buffer of the Terminal". In general, the packet may be detected at the terminal buffer using any suitable techniques. In some examples, the terminal buffer may be monitored by memory and/or system logic for the presence of a packet. In some examples, the terminal buffer may include logic that may report to the system that a packet is present. For instances where a silence descriptor packet is detected, method 100 may continue at block 115.

At block 115, "Transmit a Scheduling Request", the terminal may transmit a scheduling request to a base station.

In general, the scheduling request may be transmitted using any suitable technique and the scheduling request may include a request for an uplink data transmission allocation. In some examples, the scheduling request may be transmitted in response to the silence descriptor packet being detected at the terminal buffer of the terminal during an idle state of the Voice over Internet Protocol service. In some examples, the scheduling request may be transmitted over a wireless uplink channel such as a physical uplink shared channel. Method 100 may continue at block 120.

At block 120, "Receive a Scheduling Signal Including a Resource Allocation Sufficient to Transmit the Silence Descriptor Packet", the terminal may receive, from a base station, a resource allocation sufficient to transmit the silence descriptor packet. In general, the scheduling signal may be received using any suitable technique. In some examples, the scheduling signal may be received over a wireless downlink channel such as a wireless physical downlink control channel. As discussed, the scheduling signal may include a resource allocation sufficient to transmit a silence descriptor packet. As discussed, a silence descriptor packet may typically be smaller than a voice data packet. Therefore an allocation sufficient to transmit a silence descriptor packet may be insufficient to transmit a voice data packet. In some examples, the resource allocation may be in the range of about 12 to 15 bytes. In some examples, the resource allocation may be in the range of about 15 to 20 bytes. In some examples, the resource allocation may be in the range of about 15 to 25 bytes. Method 100 may continue at block 125.

At block 125, "Transmit the Silence Descriptor Packet", the silence descriptor packet may be transmitted to the base station. In general, the silence descriptor packet may be transmitted using any suitable technique. In some examples, the silence descriptor packet may be transmitted over a wireless channel such as a physical uplink shared channel. In some examples, the silence descriptor packet may be transmitted to the base station in response to the received scheduling signal. In some examples, the silence descriptor packet may be transmitted to the base station is according to a dynamic scheduling protocol. As discussed further herein, the method described with respect to blocks 110, 115, 120 and 125 may offer the advantages of efficient channel resource usage and limited lag time in sending the silence descriptor packet. In general, the described method may reduce the frequency of transmission of buffer status reports from the terminal to the base station during the VoIP service. In particular, in instances where the base station may not require the buffer status report to allocate further resources to the terminal such as, for example, when the terminal may be transmitting a silence descriptor packet in the idle state the transmission of buffer status reports may be substantially eliminated.

As shown in FIG. 1, method 100 may continue at block 105 such that the terminal may remain in the idle state. As will be appreciated, method 100 may be repeated any number of times through blocks 110, 115, 120, 125 and 105 while the terminal remains in the idle state and the terminal buffer detects silence descriptor packets. In some examples, the transmitted silence descriptor packets may be the same and in other examples, they may be different. As discussed, in other instances, the detected packet may be a voice data packet, as shown at block 130. The detection of a voice data packet at the terminal buffer may indicate the VoIP service may be transitioning from an idle state to an active state. For instances where a voice data packet is detected, method 100 may continue at block 135.

At block 135, "Transmit a Scheduling Request", the terminal may transmit a scheduling request to a base station. In general, the scheduling request may be transmitted using any suitable technique and the scheduling request may include a request for an uplink data transmission allocation. In some examples, the scheduling request may be transmitted in response to the voice data packet being detected at the terminal buffer of the terminal during a transition between the idle state of the Voice over Internet Protocol service to an active state of the Voice over Internet Protocol service. In some examples, the scheduling request may be transmitted over a wireless uplink channel such as a physical uplink shared channel. As discussed with respect to block 115, a scheduling request may be transmitted upon the detection of a silence descriptor packet at the terminal buffer. In some examples, the scheduling request transmitted for the detection of a voice data packet may be the same as the scheduling request transmitted for the detection of silence descriptor packet. In some examples, the scheduling requests may be different. Method 100 may continue at block 140.

At block 140, "Receive a Scheduling Signal Including a Resource Allocation Sufficient to Transmit a Silence Descriptor Packet", the terminal may receive, from a base station, a resource allocation sufficient to transmit a silence descriptor packet or a buffer status report but insufficient to transmit a voice data packet. In general, the scheduling signal may be received using any suitable technique. As discussed, in general, a buffer status report packet may be smaller than a silence descriptor packet, which may be smaller than a voice data packet. Further, as discussed, during the active state of the VoIP service, the terminal and base station may use semi-persistent scheduling which may require the base station to receive a buffer status report from the terminal. In some examples, the resource allocation may be in the range of about 12 to 15 bytes. In some examples, the resource allocation may be in the range of about 15 to 20 bytes. In some examples, the resource allocation may be in the range of about 15 to 25 bytes. In some examples, the scheduling signal may be received over a wireless downlink channel such as a physical downlink control channel. Method 100 may continue at block 145.

At block 145, "Transmit a Buffer Status Report", a buffer status report may be transmitted from the terminal to the base station. As discussed, in general, a buffer status report may be of a size such that it may be transmitted in an allocation sufficient to transmit a silence descriptor packet. In some examples, the buffer status report may be in the range of about 5 to 10 bytes. In some examples, the buffer status report may be in the range of about 10 to 15 bytes. In some examples, the buffer status report may be about 7 bytes. Therefore, during an idle state, the received allocation may be sufficient to transmit a silence descriptor packet and, during a transition to an active state, the received allocation may be sufficient to transmit a buffer status report. In some examples, it may be considered that the buffer status report may "replace" the silence descriptor packet during a transition to the active state. The buffer status report may be transmitted using any suitable techniques. In some examples, the buffer status report may be transmitted over a wireless channel such as a physical uplink shared channel. In some examples, the buffer status report may be assembled as a packet for transmission. In some examples, a packet including the buffer status report may be transmitted to the base station in response to the received scheduling signal. In some examples, the received resource allocation may be sufficient to transmit the buffer status report and additional information such as a portion of the voice data packet. In some examples, the packet including the buffer status report may also include a portion of the voice data packet. In some examples, a transmission from the terminal may include a buffer status report packet and a portion of a voice data packet. Method 100 may continue at block 150.

At block 150, "Receive a Semi-Persistent Scheduling Request Indicating an Uplink Status is Active", a semi-persistent scheduling request may be received at the terminal. In general, the semi-persistent scheduling request may indicate that an uplink status between the terminal and the base station may be active and that the VoIP status may be active. In general, the semi-persistent scheduling signal may be received using any suitable technique. In some examples, the semi-persistent scheduling signal may be received over a wireless downlink channel such as a physical downlink control channel. During semi-persistent scheduling, the base station and the terminal may be in the active state. In the active state, the terminal may regularly uplink buffer status reports and the base station may regularly allocate resources to the terminal for uplink.

As discussed, in general, the VoIP service discussed with respect to FIG. 1 may alternate between idle and active states during the service. Method 100 describes a service at the idle state and includes a discussion of a service maintaining an idle state and a discussion of a service transitioning to an active state. As discussed, in some examples, during the idle state the terminal may complete transmission of silence descriptor packets one at a time using resource allocations received from the base station and without transmitting a buffer status report. In some examples, the VoIP service may transition from an active state to an idle state. For example, the VoIP service may be under semi-persistent scheduling when a silence descriptor packet may be detected at the terminal buffer. In such examples, the VoIP service may transition to the idle state and a scheduling request may be transmitted from the terminal as discussed with respect to block 115. Further, as will be appreciated, the VoIP service may end during the service either during an idle state or an active state. In such examples, the service may be ended and communication between the terminal and the base station related to the VoIP service may be ended and any packets remaining in the terminal related to the VoIP service may be deleted. For the sake of clarity, those aspects of the VoIP service are not illustrated in FIG. 1.

Figure 2:
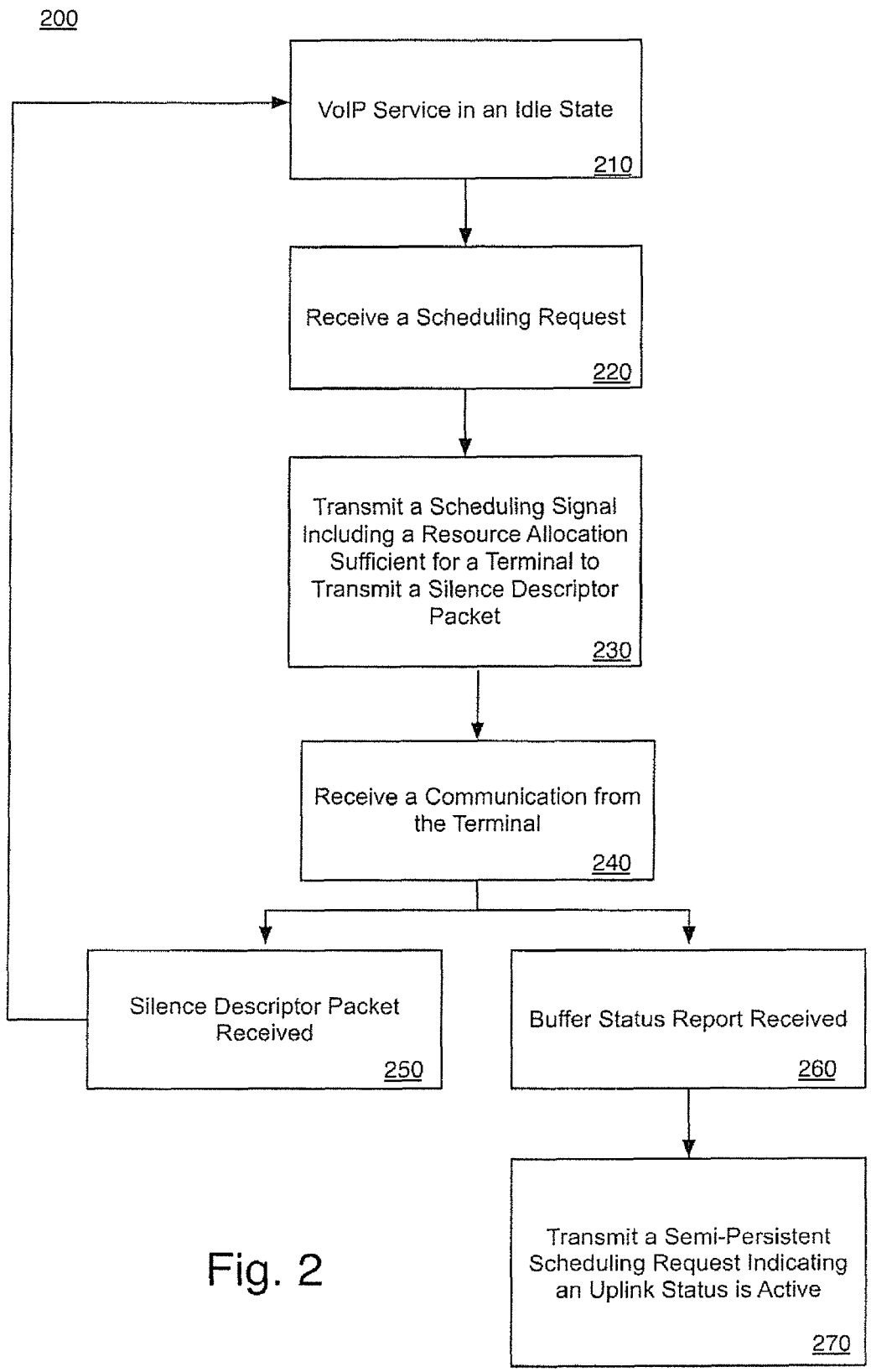
FIG. 2 is an illustration of a flow chart of an example method for providing VoIP services at a base station.

FIG. 2 is an illustration of a flow chart of an example method 200 for providing VoIP services at a base station, arranged in accordance with at least some embodiments of the present disclosure. Method 200 may be performed by hardware, software, and/or firmware of any suitable device discussed herein. Numerous alternatives to the functional blocks shown in FIG. 2 may be practiced in various implementations. For example, although method 200, as shown in FIG. 2, may comprise one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Method 100 may include one or more of functional operations as indicated by one or more of blocks 210, 220, 230, 240, 250, 260 and/or 270. The process of method 200 may begin at block 210.

At block 210, "VoIP Service in an Idle State", a base station and a terminal may be in an idle state of a VoIP service such as, for example, a portion of a call where a user of the terminal may be silent or substantially silent. In general, the base station may include any suitable device, devices, or system for communicating wirelessly with the terminal to provide the VoIP service and to provide resource allocation for the terminal. In some examples, the base station may include a scheduler or schedulers for providing and/or scheduling the resource allocation for the terminal. In some examples, the base station may provide resource allocations for a group of terminals within a service area of the base station. The base station may be configured to communicate over any suitable communication system. In some examples, the base station may be configured to communicate over a long-term evolution (LTE) communications system. Method 200 may continue at block 220.

At block 220, "Receive a Scheduling Request", a scheduling request may be received at the base station from a terminal. In general, the scheduling request may be received using any suitable techniques. In some examples, the scheduling request may be received over a wireless uplink channel such as a physical uplink shared channel. The scheduling request may include a request for an uplink allocation. In some examples, the scheduling request may be a generic request such that the request does not include information regarding the data that may follow on the uplink allocation. Method 200 may continue at block 230.

At block 230, "Transmit a Scheduling Signal Including a Resource Allocation Sufficient for a Terminal to Transmit a Silence Descriptor Packet", the base station may transmit a scheduling signal. The scheduling signal may be transmitted using any suitable techniques. In some examples, the scheduling signal may be transmitted over a wireless downlink channel such as a physical downlink control channel. In general, the scheduling signal may include a resource allocation sufficient for the terminal to transmit, and for the base station to receive, a silence descriptor packet. As discussed with respect to FIG. 1, a buffer status report may typically be smaller than a silence descriptor packet, which may typically be smaller than a voice data packet. Therefore an allocation sufficient to transmit a silence descriptor packet may be sufficient to transmit a silence descriptor packet or a buffer status report, but insufficient to transmit a voice data packet. In some examples, the resource allocation may be in the range of about 12 to 15 bytes. In some examples, the resource allocation may be in the range of about 15 to 20 bytes. In some examples, the resource allocation may be in the range of about 15 to 25 bytes. As discussed herein, the base station may transmit a scheduling signal including a resource allocation in response to received scheduling request. In various instances, the scheduling request may be related to a silence descriptor packet or a voice data packet at the terminal. In some examples, in either instance, the base station may transmit the same resource allocation such that they have the same resource amount. Method 200 may continue at block 240.

At block 240, "Receive a Communication from the Terminal", a communication may be received at the base station from the terminal. In general, the communication may be received in any suitable manner. In some examples, the communication may be received over a wireless channel such as a physical uplink shared channel. As discussed with respect to block 210, the VoIP service may be in an idle state. In some instances, the received communication may include a silence descriptor packet as shown at block 250, "Silence Descriptor Packet Received". In other instances, the received communication may include a buffer status report as shown at block 260, "Buffer Status Report Received". For instances where a silence descriptor packet is received, method 100 may continue at block 250.

At block 250, "Silence Descriptor Packet Received", the received communication may be identified at the base station as a silence descriptor packet. In general, the communication may be identified as a silence descriptor packet using any suitable technique. The silence descriptor packet may be further handled by the base station such that the packet may be routed and/or transmitted to a receiving terminal. As shown in FIG. 2, method 200 may continue at block 210 such that the VoIP service may remain in an idle state. As will be appreciated, method 200 may be repeated any number of times through blocks 210, 220, 230, 240 and 250 while the VoIP service remains in the idle state and the base station receives silence descriptor packets. As discussed, in other instances, the communication received at block 240 may include a buffer status report. In some examples, the communication received at block 240 may include a buffer status report packet. In other examples, the communication received at block 240 may include a buffer status report and a portion of a voice data packet. For instances where the communication includes a buffer status report, method 200 may continue at block 260.

At block 260, "Buffer Status Report Received", the received communication may be identified at the base station as a buffer status report and/or including a buffer status report. In general, the communication may be identified as being or including a buffer status report using any suitable technique or techniques. As discussed herein, in some examples the communication may include a packet assembled to include a buffer status report. In some examples, the communication may include a buffer status report and a portion of a voice data packet. In such examples, the portion of the voice data packet may be further handled by the base station such that the portion of the voice data packet may be routed and/or transmitted to a receiving terminal. Method 200 may continue at block 270.

At block 270, "Transmit a Semi-Persistent Scheduling Request Indicating an Uplink Status is Active", the base station may transmit a semi-persistent scheduling request to the terminal. The semi-persistent scheduling request may indicate the VoIP service may be in an active state. In general, the semi-persistent scheduling signal may be transmitted using any suitable technique. In some examples, the semi-persistent scheduling signal may be transmitted over a wireless downlink channel such as a physical downlink control channel. During semi-persistent scheduling, the base station and the terminal may be in the active state. As discussed with respect to FIG. 1, in the active state, the terminal may regularly uplink buffer status reports and the base station may regularly allocate resources to the terminal for uplink.

As discussed, in general, the VoIP service discussed with respect to FIG. 2 may alternate between idle and active states during the service. Method 200 describes a service at the idle state and includes a discussion of a service maintaining an idle state and a discussion of a service transitioning to an active state. In some examples, the VoIP service may transition from an active state to an idle state. In such examples, the base station may retract the semi-persistent scheduling from the terminal. For example, the VoIP service may be under semi-persistent scheduling when a received communication may include a buffer status report indicating the buffer may include one or more silence descriptor packets. In such examples, the VoIP service may transition to the idle state and the base station and the terminal may enter dynamic scheduling as discussed herein. Further, as will be appreciated, the VoIP service may end during the service either during an idle state or an active state. In such examples, the service may be ended and communication between the terminal and the base station related to the VoIP service may be ended. For the sake of clarity, those aspects of the VoIP service are not illustrated in FIG. 2.

Figure 3:
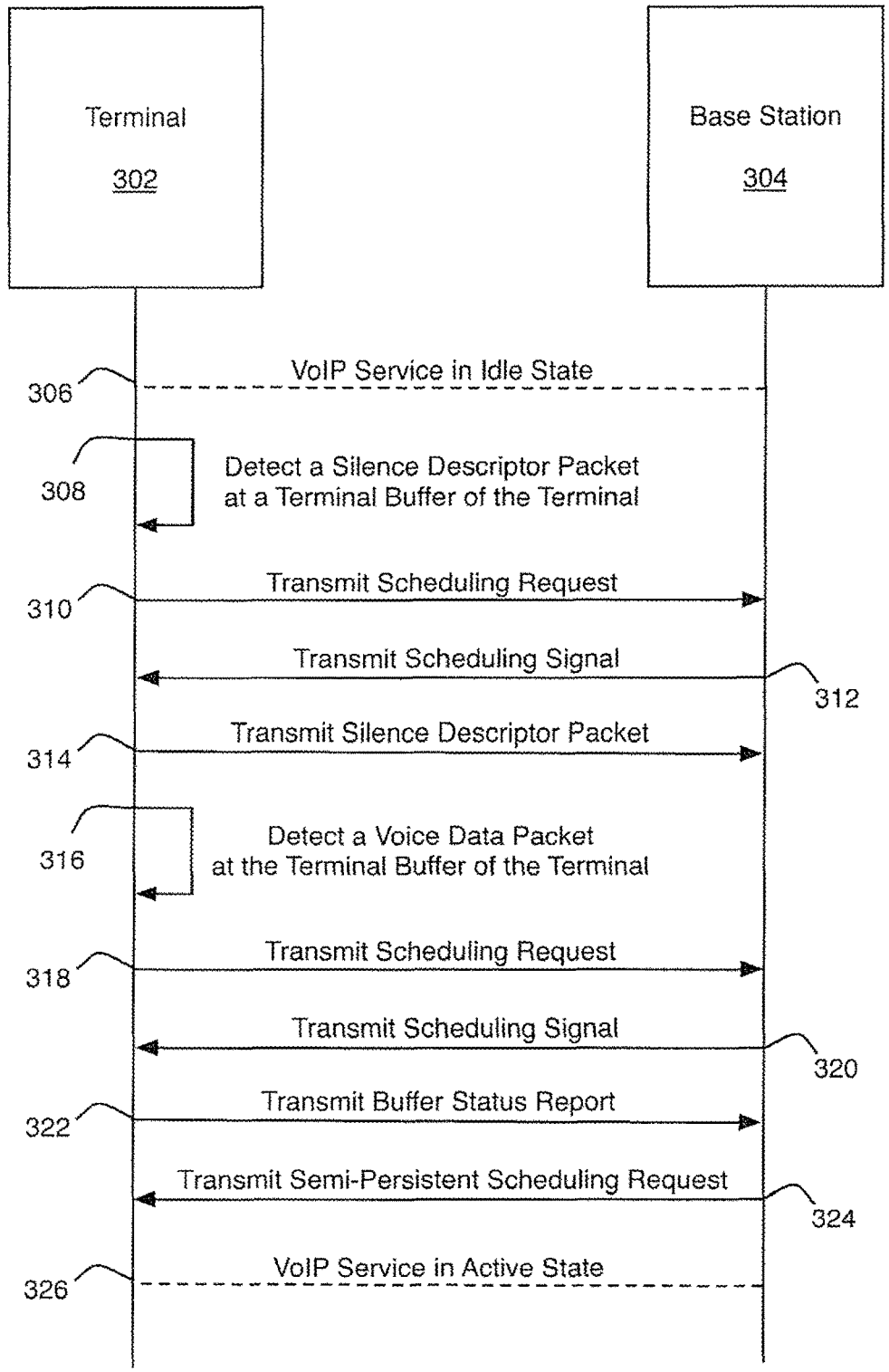
FIG. 3 is an illustration of a state diagram of an example method for providing VoIP services between a terminal and a handset.

FIG. 3 is an illustration of a state diagram of an example method 300 for providing VoIP services between a terminal and a handset. As shown in FIG. 3, method 300 may be provided by an interaction between a terminal 302 and a base station 304. In general, terminal 302 and base station 304 may communicate over any suitable wireless communications system. In some examples, terminal 302 and base station 304 may communicate over a long-term evolution (LTE) communications system. In various examples, the communications system may be a cellular phone network, a WiFi™ network, a pico-cell network, an Enhanced Data rates for GSM Evolution network (EDGE), a 3rd generation mobile telecommunications network (3G), a mobile worldwide interoperability for microwave access network (Wi-Max), a wireless wide area network (WWAN)), wideband-CDMA (WCDMA), Evolution-Data Optimized or Evolution-Data (EVDO), Orthogonal Frequency-Division Multiple Access network (OFDMA), or the like, and/or combinations thereof.

Terminal 302 may include any suitable device discussed herein such as a mobile phone, a smartphone, a laptop computer, a netbook device, a tablet device or a personal digital assistant, or the like. Base station 304 may include any suitable device, devices or system discussed herein. In some examples, base station 304 may include as a central management center, a mobile phone network operator, a scheduler or schedulers, or the like. In some examples, the scheduler or schedulers may be located next to base station 304.

Method 300 may begin at state 306, "VoIP Service in Idle State" such that a VoIP service between terminal 302 and base station 304 may be in an idle state. As discussed herein, a VoIP service may be in one of two states: idle or active. In general, the VoIP service may be provided using or based on any suitable technique or protocol. In some examples, the VoIP service may be provided based on an Adaptive Multi-Rate (AMR) technique. In some examples, the VoIP service may be provided based on the adoption of a Real Time Transport (RTP)/User Datagram Protocol (UDP)/Internet Protocol (IP) stack. As discussed, a VoIP service may be in an idle state when a user of the terminal may be silent or substantially silent. In some examples, during the idle state, the terminal and the base station may communicate using dynamic scheduling.

Method 300 may continue from state 306 to operation 308, "Detect a Silence Descriptor Packet at a Terminal Buffer of the Terminal", where terminal 302 may detect a silence descriptor packet at the terminal buffer of terminal 302. In general, the silence descriptor packet may be detected using any suitable techniques discussed herein.

Method 300 may continue from operation 308 to operation 310, "Transmit Scheduling Request", where terminal 302 may transmit a scheduling request to base station 304. In general, the scheduling request may be transmitted using any suitable techniques discussed herein and the scheduling request may include any suitable information for requesting a resource allocation from base station 304. In some examples, the scheduling request may be transmitted in response to the silence descriptor packet being detected at the terminal buffer of terminal 302.

Method 300 may continue from operation 310 to operation 312, "Transmit Scheduling Signal", where base station 304 may transmit a scheduling signal to terminal 302. In general, the scheduling signal may be transmitted using any suitable techniques discussed herein. In some examples, the scheduling signal may include a resource allocation sufficient for the terminal to transmit the silence descriptor packet. In some examples, the scheduling signal may be transmitted in response to the received scheduling request.

Method 300 may continue from operation 312 to operation 314, "Transmit Silence Descriptor Packet", where terminal 302 may transmit the silence descriptor packet to base station 304. In general, the silence descriptor packet may be prepared and transmitted using any suitable techniques discussed herein. In some examples, the silence descriptor packet may be transmitted in response to the received scheduling signal. As discussed herein, an uplink allocation received in the scheduling signal may be sufficient to transmit a silence descriptor packet (which may be smaller than a voice data packet) or a buffer status report. At operation 314, the VoIP service may be in an idle state and terminal 302 may have a silence descriptor packet to be transmitted. In such a state, terminal 302 may transmit the silence descriptor packet without first transmitting a buffer status report, which may save uplink channel resources and decrease the lag time in transmitting the silence descriptor packet. As discussed below with respect to operation 322, when the VoIP service may be transitioning from an idle state to an active state, terminal 302 may transmit a buffer status report in the received uplink allocation. As will be appreciated, the method discussed with respect to operations 308, 310, 312 and 314 may be repeated any number of times when the VoIP service may be in an idle state and silence descriptor packets may be detected at the terminal buffer of terminal 302. Further, as discussed herein, in some examples, the VoIP service may end at any point in the method of operations 308, 310, 312 and 314 while the VoIP service may be in an idle state.

Method 300 may continue from operation 314 to operation 316, "Detect a Voice Data Packet at the Terminal Buffer of the Terminal", where a voice data packet may be detected at the terminal buffer of terminal 316 which may indicate a transition from an idle state to an active state of the VoIP service. In general, the voice data packet may be detected at the terminal buffer using any suitable techniques discussed herein. In some examples, the voice data packet may be assembled by terminal 302 and stored in the terminal buffer of terminal 302 for transmission. In some examples, the terminal buffer of terminal 302 may include any suitable memory buffer and/or memory control logic to implement a terminal buffer for the storage of detection of VoIP service packets.

Method 300 may continue from operation 316 to operation 318, "Transmit Scheduling Request", where terminal 302 may transmit a scheduling request to base station 304. in general, the scheduling request may be transmitted using any suitable techniques discussed herein and the scheduling request may include any suitable information for requesting a resource allocation from base station 304. In some examples, the scheduling request may be transmitted in response to the voice data packet being detected at the terminal buffer of terminal 302. As discussed, in some examples, a scheduling request transmitted in response to a detected voice data packet may be the same as a scheduling request transmitted in response to a detected silence descriptor packet. In some examples, the scheduling requests may be different.

Method 300 may continue from operation 318 to operation 320, "Transmit Scheduling Signal", where base station 304 may transmit a scheduling signal to terminal 302. In general, the scheduling signal may be transmitted using any suitable techniques discussed herein. In some examples, the scheduling signal may include a resource allocation sufficient for the terminal to transmit a silence descriptor packet. In some examples, the scheduling signal may be transmitted in response to the received scheduling request.

Method 300 may continue from operation 320 to operation 322, "Transmit Buffer Status Report", where terminal 302 may transmit a buffer status report to base station 304. In general, the buffer status report may be prepared and transmitted using any suitable techniques discussed herein. In some examples, the buffer status report may be assembled as a buffer status report for transmission. In some examples, only a buffer status report may be transmitted. In other examples, a buffer status report and a portion of the voice data packet may be transmitted. In some examples, the buffer status report may be transmitted in response to the received scheduling signal.

As discussed herein, an uplink allocation received in the scheduling signal may be sufficient to transmit a silence descriptor packet (which may be smaller than a voice data packet) or a buffer status report. At operation 322, the VoIP service may be transitioning from an idle state to an active state and terminal 302 may have a voice data packet to be transmitted. In such a state, terminal 302 may transmit buffer status report in preparation for entering an active state of the VoIP service. As will be appreciated, method 300 may provide for efficient uplink and downlink channel usage and decreased transmission lag time. The described method allows for silence descriptor packets to be transmitted without wasteful transmission unneeded buffer status reports and the related resource allocation reply from the base station during an idle state of the VoIP service. During a transition to an active state, the buffer status report may be required to handle more frequent, larger and more resource intensive voice data packet. The method discussed with respect to operations 316, 318, 320 and 322 may be provide for efficient transmission of a buffer status report when needed during the transition from the idle state to the active state.

Method 300 may continue from operation 322 to operation 324, "Transmit Semi-Persistent Scheduling Request", where base station 304 may transmit a semi-persistent scheduling request to the terminal. The semi-persistent scheduling request may indicate the VoIP service may be in an active state. In general, the semi-persistent scheduling signal may be transmitted using any suitable technique. In some examples, the semi-persistent scheduling signal may be transmitted over a wireless downlink channel such as a physical downlink control channel.

Method 300 may continue from operation 324 to state 326, "VoIP Service in Active State", where the VoIP service between terminal 302 and base station 304 may enter an active state. As will be appreciated, the VoIP service may remain in an active state for any duration, and the VoIP service may return to an idle state at any point. When the VoIP service enters the idle state, method 300 may be repeated. Such transitions from idle to active and back may be repeated any number of times during the VoIP service. The VoIP service may end at any point in the idle or the active state.

FIG. 4 illustrates an example computer program product 400, arranged in accordance with at least some embodiments of the present disclosure. Computer program product 400 may include machine readable non-transitory medium having stored therein a plurality of instructions that, when executed, cause the machine to provide device power management according to the processes and methods discussed herein. Computer program product 400 may include a signal bearing medium 402. Signal bearing medium 402 may include one or more machine-readable instructions 404, which, when executed by one or more processors, may operatively enable a computing device to provide the functionality described herein with respect to FIG. 1, FIG. 2, and/or FIG. 3. For example, referring to the method of FIG. 3 terminal 302 and/or base station 304 may undertake one or more of the operations shown in FIG. 1, FIG. 2, and/or FIG. 3 in response to instructions 404 conveyed by medium 402.

In some implementations, signal bearing medium 402 may encompass a computer-readable medium 405, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). In some examples, signal bearing medium 402 may encompass a machine readable non-transitory medium.

Figure 5:
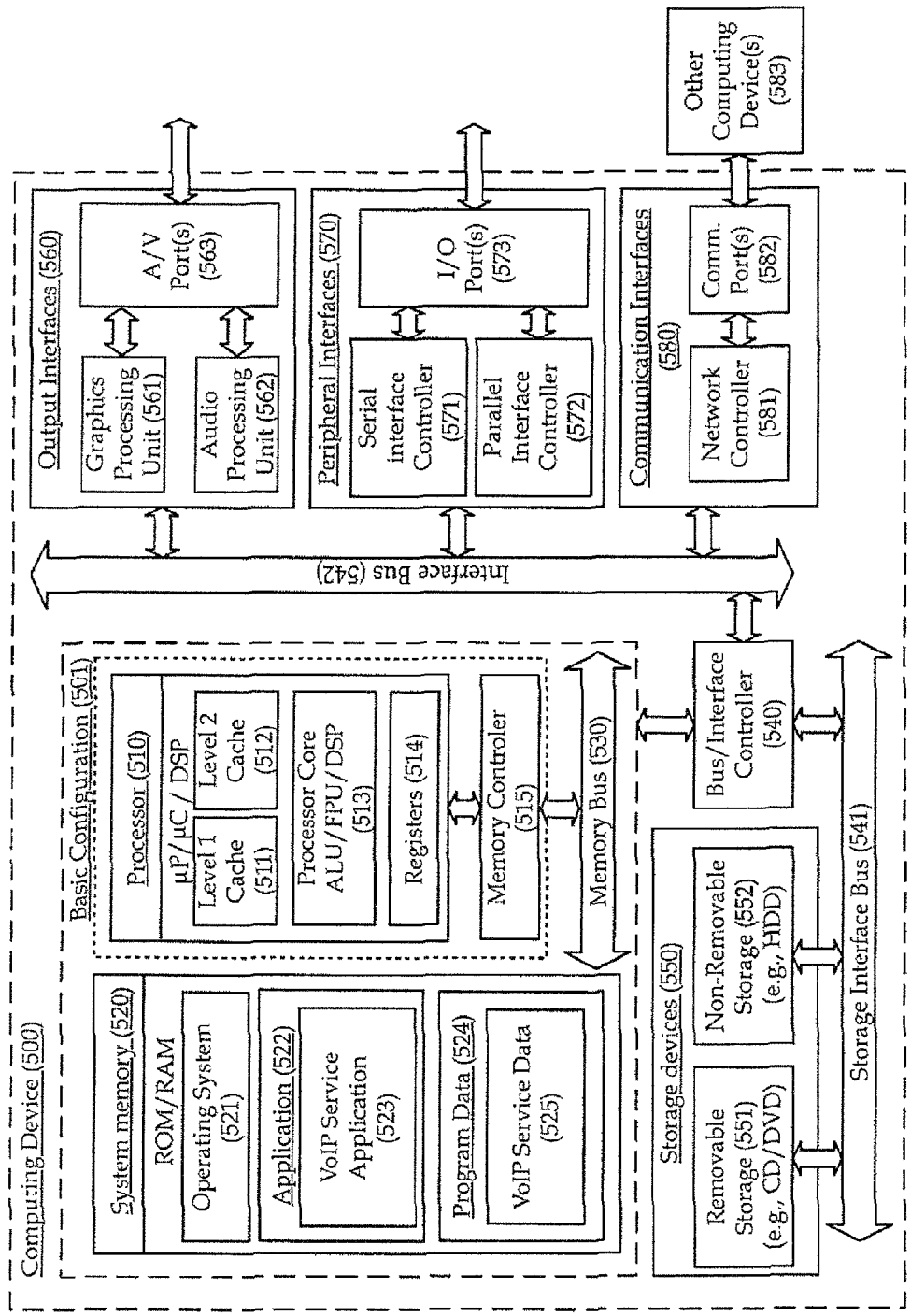
FIG. 5 is an illustration of a block diagram of an example computing device, all arranged in accordance with at least some embodiments of the present disclosure.

FIG. 5 is a block diagram illustrating an example computing device 500, arranged in accordance with at least some embodiments of the present disclosure. In various examples, computing device 500 may be configured to provide the VoIP service operations discussed herein. In some examples, computing device 500 may be configured as a terminal as discussed herein and may provide the functions and operations discussed with respect to FIG. 1 and/or FIG. 3. In some examples, computing device 500 may be configured as a base station as discussed herein and may provide the functions and operations discussed with respect to FIG. 2 and/or FIG. 3. In one example basic configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include VoIP service application 523 that can be arranged to perform the functions, actions, and/or operations as described herein including the functional blocks, actions, and/or operations described herein. Program Data 524 may include VoIP service data 525 for use with VoIP service application 523. In some example embodiments, application 522 may be arranged to operate with program data 524 on an operating system 521. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 580 may include a serial interface controller 581 or a parallel interface controller 582, which may be configured to communicate with external devices such as input devices (e.g., keyboard, mouse, pen, voice input device, touch input device, etc.) or other peripheral devices (e.g., printer, scanner, etc.) via one or more I/O ports 583. An example communication interface 580 includes a network controller 581, which may be arranged to facilitate communications with one or more other computing devices 583 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method to provide a voice over internet protocol (VoIP) service at a terminal, the method comprising:
   transmitting a first scheduling request to a base station, in response to a silence descriptor packet being detected at a terminal buffer of the terminal during an idle state of the VoIP service;
   receiving a first scheduling signal from the base station, wherein the first scheduling signal is in response to the transmitted first scheduling request, and wherein the first scheduling signal includes a first resource allocation sufficient to transmit the silence descriptor packet but insufficient to transmit an entire voice data packet;
   transmitting the silence descriptor packet to the base station, in response to the received first scheduling signal;
   completing the transmission of the silence descriptor packet to the base station;
   transmitting a second scheduling request to the base station, in response to another silence descriptor packet being detected at the terminal buffer of the terminal during the idle state of the VoIP service;
   prior to receiving a second scheduling signal in response to the second scheduling request from the base station, detecting the voice data packet at the terminal buffer;
   receiving the second scheduling signal wherein the second scheduling signal is in response to the transmitted second scheduling request, wherein the second scheduling signal includes a second resource allocation, and wherein the second resource allocation is equal to the first resource allocation; and
   transmitting a packet that includes a buffer state report and a portion of the voice data packet that is less than the entire voice data packet to the base station using the second resource allocation, wherein the portion of the voice data packet is to be transmitted by the base station to another terminal.

2. The method of claim 1, further comprising:
   after transmitting the packet that includes the buffer state report and the voice data packet to the base station, receiving a semi-persistent scheduling signal from the base station, wherein the received semi-persistent scheduling signal indicates that an uplink status is active.

3. The method of claim 1, wherein the transmitting the silence descriptor packet to the base station comprises transmitting the silence descriptor packet according to a dynamic scheduling protocol.

4. The method of claim 1, wherein the receiving the first scheduling signal comprises receiving the first scheduling signal over a physical downlink control channel, and wherein the transmitting the silence descriptor packet comprises transmitting the silence descriptor packet over a physical uplink shared channel.

5. The method of claim 1, wherein the base station provides resource allocation for a physical downlink control channel and a physical uplink shared channel.

6. The method of claim 1, wherein the terminal is part of a long-term evolution (LTE) communications system.

7. The method of claim 1, wherein the terminal comprises at least one of a mobile phone, a smartphone, a laptop computer, a netbook device, a tablet device, or a personal digital assistant.

8. A method to provide a voice over internet protocol (VoIP) service at a base station, the method comprising:
   receiving, by the base station, a first scheduling request from a terminal during an idle state of the VoIP service;
   transmitting, by the base station in response to the received first scheduling request, a first scheduling signal to the terminal, wherein the first scheduling signal includes a first resource allocation sufficient to transmit a silence descriptor packet but insufficient to transmit an entire voice data packet;
   receiving, by the base station from the terminal, the silence descriptor packet, wherein the silence descriptor packet is in response to the transmitted first scheduling signal, and wherein the silence descriptor packet is received according to a dynamic scheduling protocol;
   receiving, by the base station, a second scheduling request from the terminal;
   transmitting, by the base station in response to the received second scheduling request, a second scheduling signal to the terminal, wherein the second scheduling signal includes a second resource allocation, and wherein the second resource allocation is equal to the first resource allocation;
   receiving, by the base station from the terminal, a packet, wherein the packet is in response to the transmitted second scheduling signal and includes a buffer state report and a portion of the voice data packet that is less than the entire voice data packet;

transmitting, by the base station, the portion of the voice data packet, received along with the buffer state report in the packet, to another terminal; and in response to the receiving by the base station, the packet that includes the buffer state report and the portion of the voice data packet, transmitting, by the base station, a semi-persistent scheduling signal to the terminal.

9. The method of claim 8, wherein the transmitting the first scheduling signal comprises transmitting the first scheduling signal over a physical downlink control channel, and wherein the receiving the silence descriptor packet comprises receiving the silence descriptor packet over a physical uplink shared channel.

10. The method of claim 8, wherein the base station is part of a long-term evolution (LTE) communications system.

11. A machine readable non-transitory medium having stored therein instructions that, in response to execution, cause a terminal to provide a voice over internet protocol (VoIP) service, by performance or control of performance of operations that comprise:

transmit a first scheduling request to a base station, in response to a silence descriptor packet being detected at a terminal buffer of the terminal during an idle state of the VoIP service;

detect a first scheduling signal received from the base station, wherein the first scheduling signal is in response to the transmitted first scheduling request, and wherein the first scheduling signal includes a first resource allocation sufficient to transmit the silence descriptor packet but insufficient to transmit a voice data packet in entirety;

transmit the silence descriptor packet to the base station, in response to the received first scheduling signal;

complete the transmission of the silence descriptor packet to the base station;

transmit a second scheduling request to the base station;

detect a second scheduling signal received from the base station, wherein the second scheduling signal is in response to the transmitted second scheduling request, wherein the second scheduling signal includes a second resource allocation, and wherein the second resource allocation is equal to the first resource allocation; and transmit, to the base station in response to the received second scheduling signal, a packet that includes a buffer state report and a portion of the voice data packet that is less than the entire voice data packet using the second resource allocation, wherein the portion of the voice data packet is to be transmitted by the base station to another terminal.

12. A machine readable non-transitory medium having stored therein instructions that, in response to execution, cause a base station to provide a voice over internet protocol (VoIP) service, by performance or control of performance of operations that comprise:

detect, by the base station, a first scheduling request received from a terminal during an idle state of the VoIP service;

transmit, by the base station in response to the received first scheduling request, a first scheduling signal to the terminal, wherein the first scheduling signal includes a first resource allocation sufficient to transmit a silence descriptor packet but insufficient to transmit a voice data packet in entirety;

detect, by the base station, the silence descriptor packet received from the terminal, wherein the silence descriptor packet is in response to the transmitted first scheduling signal, and wherein the silence descriptor packet is received according to a dynamic scheduling protocol without having received a buffer state report from the terminal;

detect, by the base station, a second scheduling request received from the terminal;

transmit, by the base station in response to the received second scheduling request, a second scheduling signal to the terminal, wherein the second scheduling signal includes a second resource allocation, and wherein the second resource allocation is equal to the first resource allocation;

detect, by the base station, a packet received from the terminal, wherein the packet is in response to the transmitted second scheduling signal, and wherein the packet includes the buffer state report and a portion of the voice data packet that is less than the voice data packet;

transmit, by the base station, the portion of the voice data packet, received along with the buffer state report in the packet, to another terminal; and transmit, by the base station, a semi-persistent scheduling signal to the terminal.

13. A device, comprising:

a machine readable medium having stored therein instructions that, in response to execution, cause the device to provide a voice over internet protocol (VoIP) service, by performance or control of performance of operations that comprise:

transmit a first scheduling request to a base station, in response to a silence descriptor packet being detected at a terminal buffer of the terminal during an idle state of the VoIP service;

detect a first scheduling signal received from the base station, wherein the first scheduling signal is in response to the transmitted first scheduling request, and wherein the first scheduling signal includes a first resource allocation sufficient to transmit the silence descriptor packet but insufficient to transmit a voice data packet in entirety;

transmit the silence descriptor packet to the base station, in response to the received first scheduling signal;

complete the transmission of the silence descriptor packet to the base station, without transmission of a buffer state report to the base station;

transmit a second scheduling request to the base station, in response to another silence descriptor packet being detected at a terminal buffer of the terminal during an idle state of the VoIP service;

detect a second scheduling signal received from the base station, wherein the second scheduling signal is in response to the transmitted second scheduling request, wherein the second scheduling signal includes a second resource allocation, and wherein the second resource allocation is equal to the first resource allocation; and transmit, to the base station in response to the received second scheduling signal, a packet that includes the buffer state report and a portion of the voice data packet that is less than the entire voice data packet, wherein the portion of the voice data packet is to be transmitted by the base station to another terminal; and a processor coupled to the machine readable medium to execute the instructions.

14. A base station, comprising:
a machine readable medium having stored therein instructions that, in response to execution, cause the base station to provide a voice over internet protocol (VoIP) service, by performance or control of performance of operations that comprise:
  detect, by the base station, a first scheduling request received from a terminal during an idle state of the VoIP service;
  transmit, by the base station in response to the detected first scheduling request, a first scheduling signal to the terminal, wherein the first scheduling signal includes a first resource allocation sufficient to transmit a silence descriptor packet but insufficient to transmit a voice data packet in entirety;
  detect, by the base station, the silence descriptor packet, wherein the silence descriptor packet is in response to the transmitted first scheduling signal, and wherein the silence descriptor packet is received from the terminal according to a dynamic scheduling protocol, without having received a buffer state report from the terminal;
  detect, by the base station, a second scheduling request received from the terminal during the idle state of the VoIP service;
  transmit, by the base station in response to the received second scheduling request, a second scheduling signal to the terminal, wherein the second scheduling signal includes a second resource allocation, and wherein the second resource allocation is equal to the first resource allocation;
  detect, by the base station, a packet received from the terminal, wherein the packet is in response to the transmitted second scheduling signal and includes the buffer state report and a portion of the voice data packet that is less than the entire voice data packet;
  transmit, by the base station, the portion of the voice data packet, received along with the buffer state report in the packet, to another terminal; and
  transmit, by the base station, a semi-persistent scheduling signal to the terminal; and
a processor coupled to the machine readable medium to execute the instructions.

15. The device of claim 13, wherein a size of the buffer state report is less than a size of the silence descriptor packet, wherein a size of the portion of the voice data packet is less than or equal to a difference in size between the size of the buffer state report and the size of the silence descriptor packet.

16. The base station of claim 14, wherein a size of the buffer state report is less than a size of the silence descriptor packet, wherein a size of the portion of the voice data packet is less than equal to a difference in size between the size of the buffer state report and the size of the silence descriptor packet, and wherein the transmitted semi-persistent scheduling signal indicates that an uplink status is active.

* * * * *